(12) United States Patent
Baracchino et al.

(10) Patent No.: US 12,097,924 B2
(45) Date of Patent: Sep. 24, 2024

(54) STORAGE CONTAINER FOR SADDLE RIDING-TYPE VEHICLE

(71) Applicant: PIAGGIO & C. S.p.A., Pontedera (IT)

(72) Inventors: Luigi Baracchino, Pontedera (IT); Nicola Bernardini, Pontedera (IT)

(73) Assignee: PIAGGIO & C. SPA, Pontedera (IT)

(*) Notice: Subject to any disclaimer, the term of this patent is extended or adjusted under 35 U.S.C. 154(b) by 184 days.

(21) Appl. No.: 17/778,983

(22) PCT Filed: Dec. 16, 2020

(86) PCT No.: PCT/IB2020/062034
§ 371 (c)(1),
(2) Date: May 23, 2022

(87) PCT Pub. No.: WO2021/124153
PCT Pub. Date: Jun. 24, 2021

(65) Prior Publication Data
US 2023/0008948 A1 Jan. 12, 2023

(30) Foreign Application Priority Data
Dec. 20, 2019 (IT) .................. 102019000024940

(51) Int. Cl.
B62J 9/26 (2020.01)
B62J 9/23 (2020.01)

(52) U.S. Cl.
CPC .. B62J 9/26 (2020.02); B62J 9/23 (2020.02)

(58) Field of Classification Search
CPC .................................... B62J 9/23; B62J 9/26
USPC ........................................................ 224/412
See application file for complete search history.

(56) References Cited

U.S. PATENT DOCUMENTS

| 5,114,060 A * | 5/1992 | Boyer ............... B62J 11/00 224/431 |
| 6,783,040 B2 * | 8/2004 | Batchelor ............ B62J 9/25 224/406 |
| 8,925,778 B1 * | 1/2015 | Gordon ............... B62J 9/26 224/413 |
| 10,167,031 B2 * | 1/2019 | Seidl ................... B62J 9/27 |
| 11,472,506 B2 * | 10/2022 | Bonvissuto ........... B62J 9/30 |

FOREIGN PATENT DOCUMENTS

| CN | 206871246 U | 1/2018 |
| TW | 201114640 A | 5/2011 |

OTHER PUBLICATIONS

International Search Report for corresponding application PCT/IB2020/062034 filed Dec. 16, 2020; Mail date Mar. 15, 2021.
Written Opinion for corresponding application PCT/IB2020/062034 filed Dec. 16, 2020; Mail date Mar. 15, 2021.

* cited by examiner

Primary Examiner — Peter N Helvey
(74) Attorney, Agent, or Firm — CANTOR COLBURN LLP

(57) ABSTRACT

A storage container for a saddle riding-type vehicle, the container including an electric device requiring a power supply for the operation thereof, a wireless power receiver configured to obtain electrical power from an electromagnetic field generated by a wireless power transmitter, and a power supply circuit operatively connected to the wireless power receiver and to the electric device to supply the electric device with the electrical power obtained from the electromagnetic field.

19 Claims, 2 Drawing Sheets

STORAGE CONTAINER FOR SADDLE RIDING-TYPE VEHICLE

TECHNICAL FIELD OF THE INVENTION

The present invention relates to the technical field of saddle riding-type vehicles and is particularly directed to a storage container for a saddle riding-type vehicle.

BACKGROUND OF THE INVENTION

The application of storage containers on some types of saddle riding-type vehicles, such as motorcycles, for example, in particular, but not exclusively motor scooters with two or more wheels, is known. For example, it is known to apply a storage container to the rear part of the saddle riding-type vehicles, for example to allow one or more helmets to be stored in the storage container.

Storage containers, commonly fixed to the rear end of motorcycles, generally comprise a container body defining the storage compartment, which comprises a base and a cover hinged to the base so that it can take an opening configuration, which allows access to the storage compartment, and a closing configuration, in which the cover closes the base at the top, thus preventing the storage compartment from being accessed. The base of the container is normally a rigid body with a closed bottom which, as described above, is adapted to be closed at the top by the cover.

Storage containers are commonly used to transport objects, such as one or more helmets, but storage containers having a more specific purpose are also known, e.g. heated or cooled thermal containers for transporting food.

Some storage containers have at least one electric, electromechanical, or electronic component or device, which requires a power supply for the operation thereof, hereinafter also referred to in short as an electric load device, or in general as an electric device. For example, some storage containers have one or more devices from the following list as the electric load device: an internal lighting source, an electromechanical lock, means allowing an active control of the temperature inside the container, an active object-holding device, for example having an inflatable member and an associated inflation device.

Storage containers for motorcycles, or in general for saddle riding-type vehicles of the known art, require wired power supply systems having electric cables or, in general, electrical conductors or at least connectors, which allow the power supply required for the operation of the electric load device to be supplied to the storage container. These electric cables generally allow the storage containers to be electrically connected to the electric system of motorcycles.

The aforesaid cabled power supply systems of the storage containers of the known art are generally costly and poorly reliable, also considering that the storage containers need to be detached quickly from the motorcycle if the user wants to remove the container after parking the motorcycle, in order to prevent theft or tampering with the storage container by ill-intentioned people. If there are included connectors allowing the storage containers to be connected, by means of electric cables, to the electric system of the vehicle, it should be remembered that such connectors are exposed to the weather conditions and that such connectors are thus to be conveniently protected, for example to prevent short-circuits or to ensure a good electrical contact over time.

It is a general object of the present invention to provide a storage container for a saddle riding-type vehicle, which is capable of completely or at least partially overcoming the aforesaid drawbacks.

Such an object is achieved by a storage container for a saddle riding-type vehicle, as generally defined in claim 1. Preferred and advantageous embodiments of the aforesaid storage container are defined in the appended dependent claims.

The invention will be better understood from the following detailed description of particular embodiments thereof, given by way of non-limiting example, with reference to the accompanying drawings briefly described in the following paragraph.

DETAILED DESCRIPTION

Figure 1:
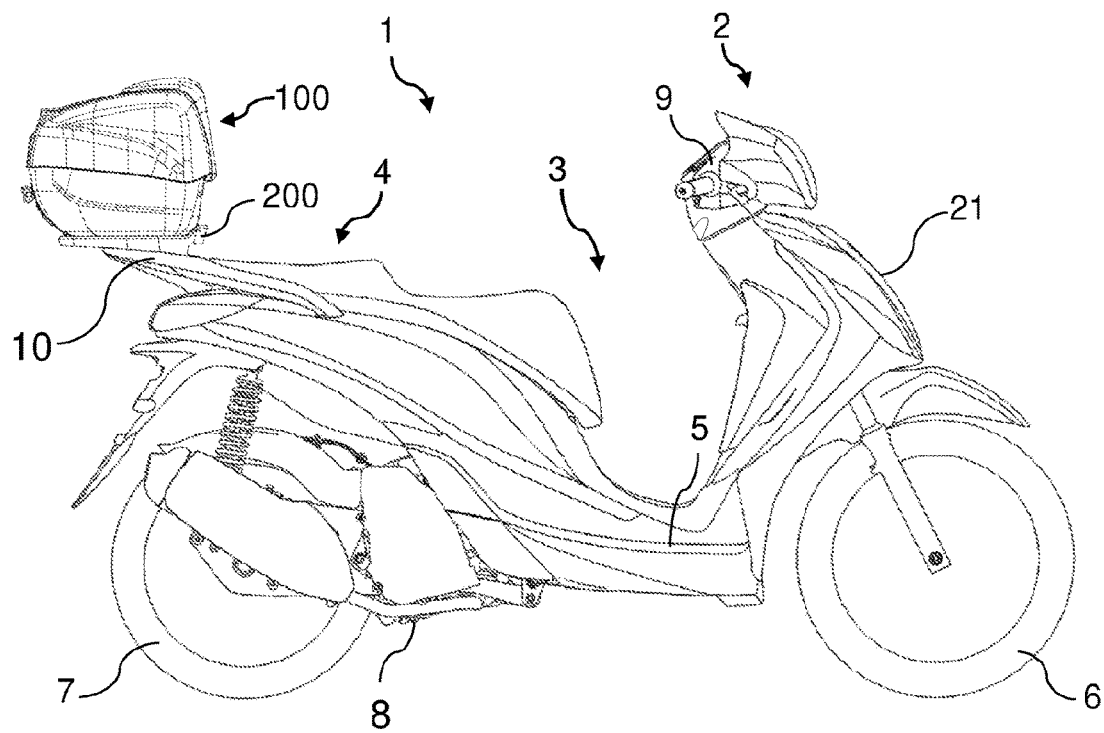
FIG. 1 shows a side plan view of a motorcycle comprising a non-limiting exemplary embodiment of a storage container.
Figure 2:
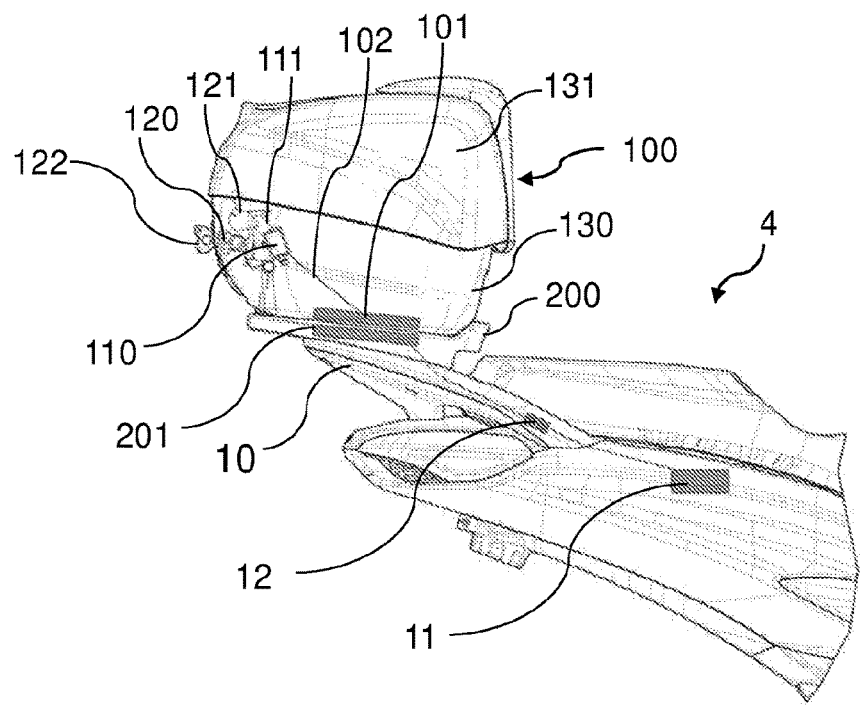
FIG. 2 shows a diagrammatic side view of a tail portion of the motorcycle in FIG. 1 to which the storage container is operatively coupled, some parts of the storage container being shown in phantom.

Identical or similar elements are indicated in the accompanying figures using the same reference numerals.

FIG. 1 shows an embodiment of a saddle riding-type vehicle 1, which in the particular example depicted, without however introducing any limitation, consists of a two-wheeled motorcycle, and in particular a two-wheeled scooter, having a front wheel 6 and a rear wheel 7.

Hereinafter, in the present description, without however introducing any limitation, reference will be made to a general motorcycle 1, meaning that the following description may be generally applied to any type of ridable saddle vehicle comprising:
- a main body 2,3,4;
- at least two wheels 6,7 constrained to the main body 2,3,4;
- a motor 8, e.g. a thermal or electric or hybrid traction motor, constrained to the main body 2,3,4 and operatively connected, directly or indirectly, to at least one of the two wheels 6,7.

The main body 2,3,4 of the motorcycle 1 has a front part 2, a tail part 4, and a central part 3 interposed between the front part 2 and the tail part 4. The central part 3 comprises, for example, a footboard 5.

In the example, the front part 2 comprises a front shield 21, a steering handlebar 9, the front wheel 6.

According to a preferred non-limiting embodiment, the tail part 4 comprises a luggage carrier 10.

Preferably, the main body 2,3,4 of the motorcycle 1 comprises at least one battery 11.

The motorcycle 1 further comprises a storage container 100 preferably and not limitedly fixed to the tail part 4 of the motorcycle 1, and more preferably to the luggage carrier 10 of the motorcycle 1. For example, the storage container 100 comprise a container body 130,131 defining the storage compartment and comprising a base 130 and a cover or door 131 (hereinafter "cover") hinged to the base 130 so that it can take an opening configuration, allowing access to the storage compartment, and a closing configuration, in which the cover 131 closes the base 130, thus preventing the storage compartment from being accessed. For example, the container body 130, 131 is shaped like a container and the cover 131 closes the base 130 at the top.

According to a first embodiment, the storage container 100 comprises a fixing base 200, such as a fixing plate, adapted and configured to fix, preferably removably, the storage container 100 to the luggage carrier 10 of the motorcycle 1. In a manner known per se, the aforesaid fixing base 200 can be mechanically coupled to the luggage carrier 10 of the motorcycle 1 by means of an anti-tampering fixing system, e.g. a system of screws or bolts which are inaccessible to be unscrewed or removed or released when the storage container is fixed to the fixing base 200. In turn, the storage container 100, and in particular the base 130 thereof, can be mechanically coupled to the fixing base 200 though removable coupling means, which are known per se to those skilled in the art.

According to an alternative embodiment, the storage container 100 is directly fixed to the luggage carrier 10 of the motorcycle 1, i.e. without the inclusion of the fixing base 200, through removable coupling means, which are known per se to those skilled in the art. These coupling means allow the base 130 of the storage container 100 to be directly fixed to the luggage carrier of the motorcycle 1, for example.

The storage container 100 comprises an electric device 110 which requires a power supply for the operation thereof. Conveniently, as shown in the examples described below, the electric device 110 forms part of the storage container 100. In particular, as shown in the examples described below, the electric device 110 is fixed to, or integrated in, the storage container 100.

In the non-limiting embodiment shown in the figures, the storage container 100 comprises a lock assembly 120 which is operable to take an operative release configuration for allowing the storage container 100 to be opened, and an operative locking configuration for preventing the storage container 100 from being opened. The electric device 110 is or comprises a controllable actuator which, from the operative locking configuration, allows the lock assembly 120 to be brought into the operative release configuration. For example, the controllable actuator is an electromagnetic actuator. For example, the lock assembly 120 comprises a latch 121 and the aforesaid controllable actuator allows the latch 121 to be moved, for example rotated. In the particular example in the figures, the aforesaid actuator is controllable to slide a piston 111 along a sliding direction in order to rotate the latch 121. Conveniently, the lock assembly 120 can also be actuated by means of a key 122.

In alternative or additional embodiments to that described above, the electric device 110 comprises one or more electric devices from the following list: an internal lighting source, means for heating/cooling the storage container 100, an active object-holding device, an electrical socket, preferably USB.

The storage container 100 comprises a wireless power receiver 101, integrated in the storage container, which is configured to obtain electrical power from an electromagnetic field generated by a wireless power transmitter 201. As will be explained below, the wireless power transmitter 201 is arranged outside the storage container 100, preferably close or adjacent to the storage container 100, in particular outside the container body 130,131. The storage container 100 further comprises a power supply circuit 102 operatively connected to the wireless power receiver 101 and to the electric device 110 to supply the electric device 110 with the electrical power obtained from the electromagnetic field.

According to an advantageous embodiment, the electrical power obtained from the electromagnetic field by the wireless power receiver 101 is of the inductive type. For example, the wireless power receiver 101 is an inductive coupling receiver of the resonant type or of the non-resonant type. For example, the wireless power receiver 101 comprises at least one electric coil which, when immersed in a variable magnetic field, is such as to supply an induced electric current. Preferably, the electric coil is a planar coil, such as a spiral planar coil. According to a possible embodiment, the wireless power receiver 101 complies with the Qi standard developed by the Wireless Power Consortium, in accordance with the first version of the standard or any one of the subsequent versions.

If the storage container 100 comprises a fixing base 200 to allow the storage container 100 to be fixed to the motorcycle 1, it is advantageous for the fixing base 200 to comprise a transmitter 201, i.e. a wireless power transmitter 201, configured to generate an electromagnetic field which, upon hitting the wireless power receiver 101, allows the latter to extract useful electrical power for supplying the electric device 110. For example, the wireless power transmitter 201 is integrated in the fixing base 200. Therefore, it can be understood how the wireless power transmitter 201 is functionally complementary to the wireless power receiver 101. For example, the wireless power transmitter 201 also comprises at least one or more electric coils, which are preferably planar, adapted to generate a variable magnetic field which hits the wireless power receiver 101 when the storage container 100 is coupled to the fixing base 200. For example, the wireless power transmitter 201 also complies with the Qi standard developed by the Wireless Power Consortium, in accordance with the first version of the standard or any one of the subsequent versions.

The wireless power transmitter 201 is connected to a power source of the motorcycle 1, e.g. to battery 11 of the motorcycle 1 or in general to the electric system of the motorcycle 1, e.g. by means of a connector 12.

When the fixing base 200 is not provided and the storage container 100 is directly fixed to the motorcycle 1, e.g. to the luggage carrier 10, as for the wireless power transmitter 201 all the considerations explained in the previous paragraphs relating to the wireless power transmitter 201 described above apply, with the sole difference that in this case the wireless power transmitter 201 is integrated in the motorcycle 1, e.g. in the luggage carrier 10.

In any case, it is particularly advantageous for the wireless power receiver 101 to be integrated in the base 130 of the container body 130,131, preferably in a bottom wall of the base 130, e.g. in the wall of the base 130 of the storage container 100, which rests on the fixing base 200 or on the luggage carrier 10, so that the wireless power receiver 101 is arranged as close as possible to the fixing base 200 or to the luggage carrier 10, in order that the wireless power receiver 101 is arranged as close as possible to the wireless power transmitter 201.

Figure 3:
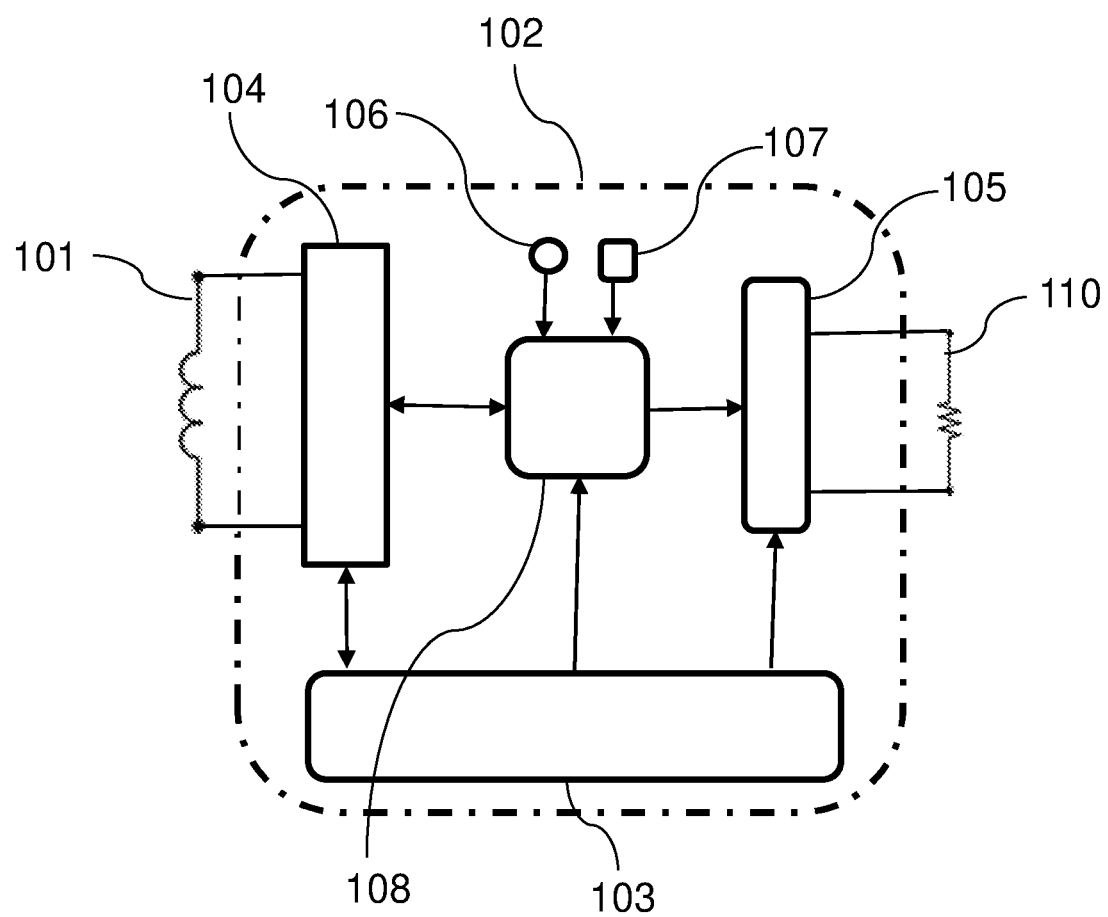
FIG. 3 shows a circuit block diagram of the storage container in FIGS. 1 and 2.

FIG. 3 shows a circuit block diagram of a preferred non-limiting embodiment of the power supply circuit 102. As described above, such a power supply circuit 102 forms part of the storage container 100 and is operatively interposed between the wireless power receiver 101 and the electric device 110.

According to a particularly advantageous embodiment, the power supply circuit 102 comprises a storage device 103 for storing the electrical power extracted from the wireless power receiver 101. For example, the storage device 103 comprises a rechargeable battery and/or a capacitor, preferably a supercapacitor.

According to an advantageous embodiment, the power supply circuit 102 comprises a conditioning circuit 104 (also referred to as a "power pick up unit"), which allows the electrical power extracted from the wireless power receiver 101 to be taken to an exploitable form on board the storage container 110, e.g. in order to store it in the storage device 103. The conditioning circuit 104 can comprise a recharge circuit, for example, if the storage device 103 comprises a rechargeable battery.

Conveniently, the power supply circuit 102 can further comprise a driving circuit 105 of the electric device 110, such as a power circuit adapted to provide the electric device 110 with a power supply, which meets the parameters required for the operation of the electric device 110, such as parameters in terms of voltage and/or current.

According to an advantageous embodiment, the power supply circuit 102 further comprises a control device 106 which is operable for selectively powering the electric device 110. For example, if the electric device 110 comprises an internal light, the control device 106 could be or comprise an opening sensor of the storage container 100, so as to allow an automatic lighting of the internal light upon opening the storage container.

According to a preferred embodiment, the control device 106 is a manual control device positioned outside the storage container 100, preferably on the rear outer side of the storage container 100, i.e. on the side which, under a use condition in which the storage container 100 is coupled to the motorcycle 1, faces the side opposite to the front part 2 of the motorcycle 1. For example, the manual control device 106 comprises a switch, preferably a push-button switch. For example, the aforesaid manual control device 106 allows a user to open the storage container 100 without using the key 122 if the electric device 110 is a controllable actuator of the lock assembly 120.

According to a particularly advantageous embodiment, the power supply circuit 102 is such as to activate or deactivate the power supply of the electric device 110 based on a consent given or denied, respectively, by an authorization control system. Thereby, an unauthorized use of the storage container 100 by ill-intentioned people is advantageously avoided. For example, if the electric device 110 is a controllable actuator of the lock assembly 120, ill-intentioned people are prevented from opening the storage container 100.

According to a particularly advantageous embodiment, the authorization control system is included in the storage container 100, particularly in the power supply circuit 102. Advantageously, this allows an authorized user to use the electric device 110, for example in order to open the storage container 100, also when the storage container 100 is removed from the motorcycle 1. This may occur both when the storage container 110 comprises an electrical power storage device 103 and when it does not. In fact, however, it is theoretically possible to obtain electrical power by means of the wireless power receiver 101 even from any other wireless power transmitter which is functionally complementary to the wireless power receiver 101, and which is integrated, for example, in a charging pad or in a docking station which can be kept for example at home, in the garage or in the office by a user.

According to an advantageous embodiment, the authorization control system comprises a radio receiver 107 of an authorization signal. For example, the authorization signal is a radio signal transmitted by a keyfob logically paired with the storage container 100 and/or with the motorcycle 1, so that the electric device 110 can be electrically powered only when an authorized user, who possesses and has the keyfob with him/her, is within the visibility range of the keyfob by the radio receiver 107.

According to a particularly advantageous embodiment, the aforesaid authorization control system is adapted and configured to activate or deactivate the power supply of the electric device 110 based on at least one operation state of the motorcycle 1, for example as a function of one or more of the following listed conditions: the state of start-up or switch-off of the motor 8 of the motorcycle 1 even as a function of the state of start-up or switch-off of the control panel of the motorcycle 1, the speed of the motorcycle 1, the parking state of the motorcycle 1, the interval of time elapsed since one of the previous conditions occurred or ceased.

The aforesaid conditions can be autonomously verified by the power supply circuit 102, particularly if the power supply circuit 102 comprises an electrical power storage device 103. For example, the authorization control system can deny the consent whenever the motor of the motorcycle 1 is on, for example to prevent the storage container 100 from being opened by ill-intentioned people when the motor 8 of the motorcycle 1 is on but the latter is still at a traffic light or in a queue, for example. In order to detect whether the motor 8 is on, the authorization control system can verify, for example, whether the wireless power transmitter 201 is transmitting or not an electromagnetic field, based on the electrical power obtained by the wireless power receiver 101. In this case, it is possible to configure the motorcycle 1 so that it can supply the transmitter 201 only when the motor 8 is on. In other words, the information on the state of the motorcycle 1 can also be transmitted wirelessly to the storage container 100, e.g. by means of the transmitter 201 or by means of one or more separate transmitters configured to transmit data or information by means of the transmission of radiofrequency signals (e.g. Wi-Fi or Bluetooth or RFID).

However, if the storage container 100 is not provided with an electrical power storage device 103, all the authorization logics can be managed on board the motorcycle 1, e.g. by the electronic control unit (ECU) of the motorcycle 1, establishing the authorization conditions which allow the motorcycle 1 to power the transmitter 201 and thus to power the electric device 110, for example.

According to a preferred embodiment, the power supply circuit comprises an electronic control unit 108, which is possibly powered by the electrical power stored in the storage device 103 and which allows, for example, one or more of the operations defined in the following list to be managed: charging the storage device 103, driving the electric device 110, managing the inputs of the control device 106, controlling the authorization by processing the signals outputted by the radio receiver 107 and/or by means of the electrical power extracted from the wireless power receiver 101, for example.

Note that a storage container 100 of the type described above is also an object of the present patent application, which comprises, in addition to or instead of the wireless power receiver 101, a wireless power transmitter which is equal or similar to the wireless transmitter 201 detailed in the present description and operatively connected to an electrical power storage unit 103 included or integrated in the storage container 100, such as a rechargeable battery, a capacitor, a supercapacitor, for example.

By virtue of the wireless power transmitter included in the storage container 100 and by virtue of the electrical power storage unit 103, the storage container 100 can be advantageously used to supply electrical power to the motorcycle 1 and/or to supply electrical power to any other device requiring a power supply (e.g. a smartphone). This can be useful both when the storage container 100 is fixed to the motorcycle 1 and when it is removed therefrom.

If the wireless power receiver 201 is present in the storage container 100, for the principle or theorem of reciprocity of antennae, the wireless power receiver 201 with modifications within the reach of those skilled in the art can be used as a wireless power transmitter of the storage container 100. In this case, the storage container 100 can be selectively used as a source of wireless power or as a load adapted to absorb a wireless power.

If the wireless power receiver 201 is not present and the wireless power transmitter is present instead, the storage container 100 can be used however by providing for the possibility to charge the storage unit 103, e.g. by including a charging socket of the storage container 100 for the connection to an external power source, e.g. for the connection to an electrical power distribution network by means of which the storage container 100 can be charged both when it is removed from the motorcycle 1 and when it is fixed to the motorcycle 1 and the motorcycle 1 is at an electric charging station, for example.

Based on the above explanation, it is thus possible to understand how a storage container of the type described above allows the aforesaid objects to be achieved with reference to known prior art.

Without prejudice to the principle of the invention, the embodiments and details may be widely varied with respect to the above disclosure given merely by way of non-limiting example, without departing from the scope of the invention as defined in the appended claims.

The invention claimed is:

1. A storage container for a saddle riding-type vehicle, the container comprising
an electric device requiring a power supply for the operation thereof;
a wireless power receiver configured to obtain electrical power from an electromagnetic field generated by a wireless power transmitter; and
a power supply circuit operatively connected to the wireless power receiver and to the electric device to supply the electric device with the electrical power obtained from the electromagnetic field;
wherein the storage container comprises a container body having a base and a cover or door, and
wherein the wireless power receiver is integrated in the base of the container body.

2. The storage container according to claim 1, comprising a fixing base, said fixing base being attachable to a saddle riding-type vehicle to allow the storage container to be fixed to the vehicle.

3. The storage container according claim 2, wherein said fixing base for fixing to the vehicle comprises said wireless power transmitter.

4. The storage container according to claim 1, wherein the wireless power receiver is integrated in a bottom wall of the base.

5. The storage container according to claim 1, wherein the power supply circuit further comprises a storage device for storing the electrical power obtained.

6. The storage container according to claim 5, wherein the storage device comprises a rechargeable battery and/or a capacitor.

7. The storage container according to claim 1, wherein the electric device comprises one or more devices from the following list: an internal lighting source, a controllable electric actuator of a lock, means for heating/cooling the storage container, an active object-holding device, an electrical socket.

8. The storage container according to claim 1, wherein the electrical power obtained from the electromagnetic field is of the inductive type.

9. The storage container according to claim 1, wherein the power supply circuit further comprises a control device which is operable to selectively supply the electric device.

10. The storage container according to claim 9, wherein the control device is positioned outside the storage container.

11. The storage container according to claim 9, wherein the control device comprises a switch.

12. The storage container according to claim 1, wherein the power supply circuit is such as to activate or deactivate the power supply of the electric device based on a consent given or denied, respectively, by an authorization control system.

13. The storage container according to claim 12, wherein the authorization control system is included in the storage container.

14. The storage container according to claim 12, wherein the authorization control system comprises a radio receiver for receiving an authorization signal.

15. The storage container according to claim 1, wherein the power supply circuit forms part of the storage container and is operatively interposed between the wireless power receiver and the electric device.

16. The storage container according to claim 1, wherein the electric device forms part of the storage container.

17. The storage container according to claim 1, wherein the electric device is fixed to, or integrated in, the storage container.

18. The storage container according to claim 1, wherein the wireless power transmitter is arranged outside the storage container.

19. A saddle riding-type vehicle comprising:
a luggage carrier; and
a storage container according to claim 1;
wherein the storage container is adapted and configured to be fixed to the luggage carrier,
wherein said vehicle comprises a power source operatively connected to the storage container for transferring electrical power from the vehicle to the storage container.

* * * * *